(12) United States Patent
Hu et al.

(10) Patent No.: US 12,512,653 B1
(45) Date of Patent: Dec. 30, 2025

(54) JUNCTION BOX

(71) Applicant: Wangs Alliance Corporation, Port Washington, NY (US)

(72) Inventors: DunPing Hu, Blaine, MN (US); Thomas Roberti, Hauppauge, NY (US); Renyun Li, Dongguan (CN); Linhong Li, Dongguan (CN)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 19/006,445

(22) Filed: Dec. 31, 2024

Related U.S. Application Data

(60) Provisional application No. 63/679,754, filed on Aug. 6, 2024, provisional application No. 63/679,557, filed on Aug. 5, 2024.

(51) Int. Cl.
*H02G 3/08* (2006.01)

(52) U.S. Cl.
CPC .................................. *H02G 3/081* (2013.01)

(58) Field of Classification Search
CPC .......... H02G 3/08; H02G 3/081; H02G 3/083; H02G 3/12; H02G 3/121; H02G 3/126; H02G 3/125; H02G 3/20; H05K 5/00; H05K 5/02; F21V 21/02; F21V 21/00; F21V 21/03; F21V 21/04
USPC ....... 174/480, 481, 50, 53, 57, 58, 520, 559, 174/61, 63, 535, 542; 220/3.2–3.9, 4.02; 248/906, 343; 361/600, 601
See application file for complete search history.

(56) References Cited

U.S. PATENT DOCUMENTS

| | | | | |
|---|---|---|---|---|
| 3,622,029 A | * | 11/1971 | Ware | H02G 3/086 220/8 |
| 3,690,501 A | * | 9/1972 | Ware | H02G 3/16 220/8 |
| 3,907,334 A | * | 9/1975 | Schera, Jr. | H02G 3/06 285/302 |
| 5,248,850 A | * | 9/1993 | Laney | H02G 3/0616 285/298 |
| 5,332,866 A | * | 7/1994 | Sawamura | H02G 3/0608 174/101 |
| 5,432,676 A | * | 7/1995 | Satoh | H04M 1/0216 361/755 |
| 6,402,350 B1 | * | 6/2002 | Ward | F21V 23/026 362/150 |
| 6,444,903 B2 | * | 9/2002 | Saeki | H02G 3/0437 174/72 A |
| 7,964,796 B2 | * | 6/2011 | Suzuki | H02G 3/0437 174/72 A |
| 9,506,611 B2 | * | 11/2016 | Ramirez | F21V 29/15 |

(Continued)

OTHER PUBLICATIONS

"2" IC 600 and 1000 Lumens LED Round Downlight Cone 2LEDTRIM G2 DC," Acuity Brands Lighting, Inc. Sep. 8, 2020.

*Primary Examiner* — Angel R Estrada
(74) *Attorney, Agent, or Firm* — Weiss & Arons LLP

(57) ABSTRACT

Junction apparatus for providing power to a fixture is provided. The apparatus includes a housing having a first end that is configured to house a line power termination and a second end that is configured to house a load power termination. The first and second ends, or, alternatively, a longitudinal axis of the first end and a longitudinal axis of the second end, or, alternatively, an axis of the first end and an axis of the second end are configured to articulate with respect to each other.

68 Claims, 7 Drawing Sheets

(56) References Cited

U.S. PATENT DOCUMENTS

| | | | |
|---|---|---|---|
| 10,903,637 B2 * | 1/2021 | Nehls | ................ H02G 3/14 |
| 2020/0041106 A1 | 2/2020 | Ninomiya et al. | |

* cited by examiner

JUNCTION BOX

CROSS-REFERENCE TO RELATED APPLICATIONS

This application is a non-provisional application of U.S. Provisional Application No. 63/679,557, entitled, "Junction Box," filed on Aug. 5, 2024, and of U.S. Provisional Application No. 63/679,754, entitled, "Junction Box," filed on Aug. 6, 2024, both of which are hereby incorporated by reference herein in their respective entireties.

BACKGROUND

Junction boxes are typically used to provide an enclosure for terminating a power line at a load line. Junction boxes are typically installed in architectural structures in connection with fixtures that are installed in those structures. Sometimes, space in the structures is limited. Sometimes access holes to the space are limited to a size that matches the fixture to be installed. When the aperture and the space are small compared to the junction box, the structure may interfere with insertion of the junction box.

It would be desirable, therefore, to provide apparatus and methods for housing connections between power lines, circuits and load lines in a small architectural space with a small access hole.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
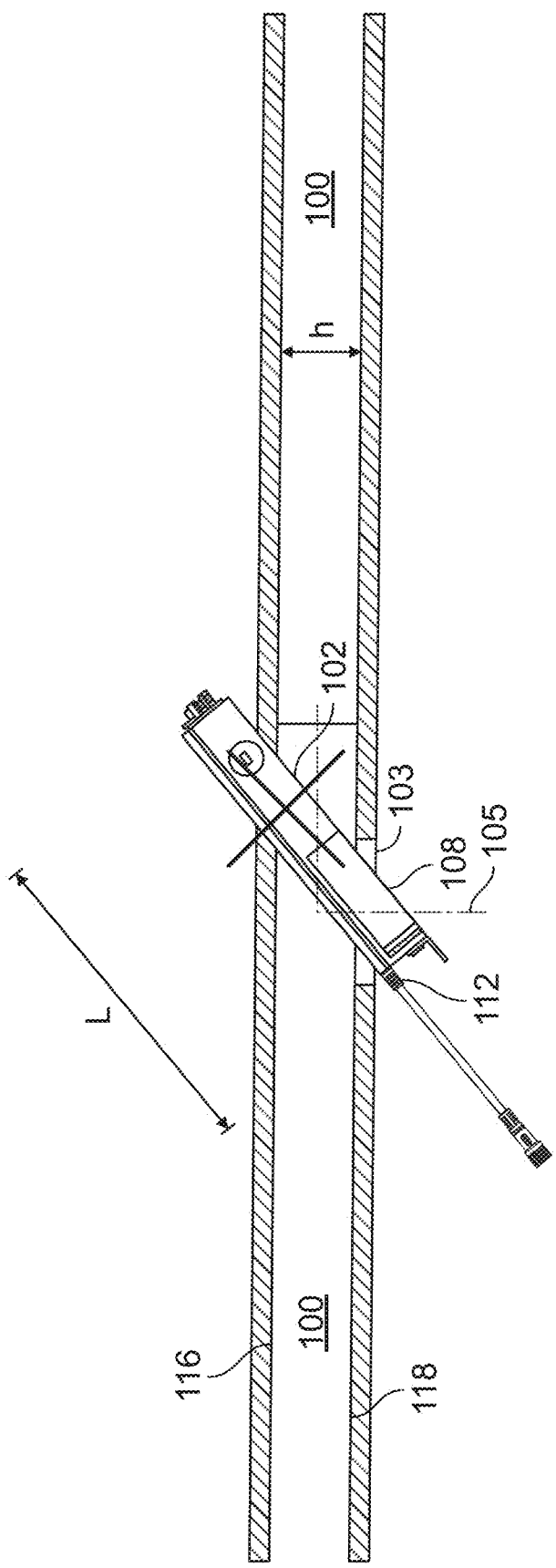
FIG. 1 shows conventional apparatus in partial cross section, along with environmental structure in cross section.

Apparatus and methods for providing power to a fixture are provided. The apparatus may include a housing. The housing may be bendable. The housing may be articulable.

The housing may include a first end. The first end may be configured to house a line power termination. The line power termination may include a lead, a terminal or any suitable component for electrical connection. The line power termination may be configured to receive power from a power line. The line power termination may be configured to receive power from a connector that is in electrical communication with a power line. The line power termination may be configured to receive power from a cable that is in electrical communication with the power line. The power line may be in or at a residential or commercial building. The power line may be configured to provide power at 110-120 or 220-240 VAC, or any other suitable power. The line power termination may be configured for providing electrical communication connection of a fixture control or power conditioning circuit in the housing to the power line.

The housing may include a second end. The second end may be configured to house a load power termination. The load power termination may include a lead, a terminal or any suitable component for electrical connection. The load power termination may be configured to provide power to a load. The load power termination may be configured to provide power to a connector that is in electrical communication with the load. The load power termination may be configured to provide power to a cable that is in electrical communication with the load. The load may include a fixture. The fixture may include a light, a fan or any other suitable fixture. The load power termination may be configured to provide electrical communication from a fixture controller or power conditioning circuit in the housing to the load.

The first and second ends may be configured to articulate with respect to each other.

The housing may include one or more segments. A segment may be configured to articulate with respect to a neighboring segment. A segment may include a chamber. The first end may include a segment. The second end may include a segment. There may be one or more segments in between the first and the second end.

The apparatus may include one or more electrical components. An electrical component may include a power source or power supply. The power source or power supply may receive power from the power line. The power source or power supply may provide a voltage level of 110-120 or 220-240 VAC. In some embodiments, the power supply may include a step-down transformer or other components to reduce the voltage level of the input power to a fixture operational voltage or reduce an input current to a fixture operational current.

An electrical component may include an LED light source driver for the fixture. An electrical component may include a power line control module. An electrical component may include a switch. An electrical component may include a microprocessor. The switch may include a selector. The selector may provide a selection of a light characteristic. The characteristic may include a color-correlated temperature ("CCT"). The characteristic may include an intensity. The selector may provide a power selection.

The apparatus may include one or more thermal components. The thermal component may include a heat sink.

One or more of the electrical components may be configured to be in electrical communication with the fixture. Electrical communication between a component in a segment and the fixture may be via a cable (alternatively referred to herein as a "wire" or "lead"). Electrical communication between a component in a segment and the fixture may be via a wireless link. Electrical communication between a component in a segment and the fixture may be via a conductor on a printed circuit board ("PCB").

The first end may include one or more cut-outs for electrical cables. The cables may include one or more hot, neutral and ground lines. The cables may include one or more communication lines. The communication lines may carry lighting instructions. The cables may include one or more dimming conductors. The conductors may transmit a dimming signal. For example, the dimming signal may be a 0-10 VDC signal corresponding to a user-adjustable brightness level.

The first end may be in electrical communication with one or more other first ends of other housings. The housings may form a daisy chain that runs through architectural structure to provide power to fixtures disposed in the structure.

The first end may include one or more cut-outs for power lines. The power lines may include one or more hot, neutral and ground lines. The first end may be in electrical communication with one or more other first ends of other housings. The housings may form a daisy chain that runs through architectural structure to provide power to fixtures disposed in the structure.

The fixture may be configured to be mounted in a plenum space having a height h. The fixture may be, for example, a nominal "2-in. fixture." h may be, for example, about 2". The fixture may be configured to be mounted in an aperture having a diameter d. The housing may have a length that this the sum of a length $L_1$ of the first end and $L_2$ of the second end. d and h may be configured such that the housing may be unable to negotiate an elbow-shaped turn between a central axis of the aperture and an axis of the plenum when $L_1$ and $L_2$ are in line with each other.

The first end may be configured to conform to a volume-standard for housing a wire-nut power line termination. The wire nut may include a small plastic cap that screws onto the stripped ends of the wires, twisting them together to create a secure electrical connection.

The second end may be configured to house a lighting module circuit that is configured to provide current to an LED light source.

The first end and the second end may be linked pivotably to each other. The first end and the second end may be configured to articulate between a first angle and a second angle with respect to each other. The first angle may be an angle at which the first and second ends can pass along an elbow-shaped path into a plenum space. The second angle may be an angle at which the first and second ends cannot pass along the path.

Angle 214 (FIG. 2) illustrates a frame of reference for the first and second angles.

Table 1 lists illustrative ranges that may include the first angle.

TABLE 1

Illustrative ranges that may include the first angle.
Illustrative ranges (degrees of arc) that may include first angle

| Lower limit | Upper limit | Lower limit | Upper limit | Lower limit | Upper limit |
|---|---|---|---|---|---|
| 0 | 5 | 65 | 70 | 120 | 125 |
| 5 | 10 | 70 | 75 | 125 | 130 |
| 10 | 15 | 70 | 75 | 130 | 135 |
| 15 | 20 | 75 | 80 | 135 | 140 |
| 20 | 25 | 80 | 85 | 140 | 145 |
| 25 | 30 | 85 | 90 | 145 | 150 |
| 30 | 35 | 90 | 95 | 150 | 155 |
| 35 | 40 | 95 | 100 | 155 | 160 |
| 40 | 45 | 100 | 105 | 160 | 165 |
| 45 | 50 | 105 | 110 | 165 | 170 |
| 50 | 55 | 110 | 115 | 170 | 175 |
| 55 | 60 | 115 | 120 | 175 | >175 |
| 60 | 65 | | | | |

TABLE 1-continued

Illustrative ranges that may include the first angle.
Illustrative ranges (degrees of arc) that may include first angle

| Lower limit | Upper limit | Lower limit | Upper limit | Lower limit | Upper limit |
|---|---|---|---|---|---|
| Other suitable lower limits | Other suitable upper limits | Other suitable lower limits | Other suitable upper limits | Other suitable lower limits | Other suitable upper limits |

Table 2 lists illustrative ranges that may include the second angle.

TABLE 2

Illustrative ranges that may include the second angle.
Illustrative ranges (degrees of arc) that may include second angle

| Lower limit | Upper limit | Lower limit | Upper limit | Lower limit | Upper limit |
|---|---|---|---|---|---|
| 135 | 140 | 170 | 175 | 200 | 205 |
| 140 | 145 | 175 | 180 | 205 | 210 |
| 145 | 150 | 180 | 185 | 210 | 215 |
| 150 | 155 | 185 | 190 | 215 | 220 |
| 155 | 160 | 190 | 195 | 220 | 225 |
| 160 | 165 | 195 | 200 | 225 | >225 |
| Other suitable lower limits | Other suitable upper limits | Other suitable lower limits | Other suitable upper limits | Other suitable lower limits | Other suitable upper limits |

The second angle may be greater than the first angle. A first detent may prevent articulation of the ends to a third angle that is greater than the second angle.

The second angle may be greater than the first angle. A second detent may prevent articulation of the ends to a fourth angle that is less than the first angle.

The apparatus may include a pivot. The pivot may include a hinge. The first and second ends may be configured to articulate with respect to each other via the hinge. The hinge may include a living hinge. The living hinge may include polymer. The hinge may include an arcuate track and a projection that slidably engages the track. The hinge may include a swivel.

The hinge may include a first pivot point on a first side of the housing. The hinge may include a second pivot point. The second pivot point may be on a second side of the housing. The second pivot point may be aligned with the first pivot point. Placement of the pivot points on opposite sides of the housing may provide stability to the housing when the housing is held by only one end, for example, the second end, when an installer inserts the first end into the plenum space.

A pivot point between the two ends may be provided at the top of the housing, for example, as shown in FIGS. 2-6. The pivot point may be provided at the bottom of the housing, for example, to accommodate smaller values of the first angle. The pivot point may be provided at a position that is intermediate the top and bottom of the housing.

The first end may include an enclosure. The second end may include an enclosure.

The apparatus may include a conduit. The first end may include a first enclosure. The second end may include a second enclosure. Together, the first end, the second end and the conduit may define the housing.

The conduit may define a flexible passageway between the first enclosure and the second enclosure. A segment may be connected to a neighboring segment by a conduit. A segment may be connected to a neighboring segment by a flexible conduit. A segment may include a chamber that is connected to a chamber of a neighboring segment by a conduit.

The first and second ends may be configured to articulate with respect to each other based on flexing of the conduit. The conduit may be biased to create a predetermined angle between the ends in a relaxed state.

The apparatus may include a connecting member. The first and second ends may be configured to articulate with respect to each other based on flexing of the connecting member. The connecting member may be separate from the conduit.

Illustrative embodiments of apparatus and methods in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

FIG. 1 shows conventional apparatus. Such conventional apparatus may include junction boxes such as junction box 102, which is not articulable. For context, it should be noted conventional junction boxes may be used to house an LED lighting module circuitry 108 and support load power cable end 112. However, top and bottom ceiling structures 116 and 118 may interfere with installation of conventional junction boxes, such as junction box 102.

For example, placing junction box 102 within plenum space 100 (having height h) may require junction box 101 to pass through fixture aperture 103. Specifically, the "elbow-shaped" path 105 associated with entry of the junction box 102 through fixture aperture 103 and into plenum space 100 may preclude entry of junction box 102 through fixed aperture 103 absent modifications to the ceiling structures 116 and 118. The extent of the obstacles presented by ceiling structures 116 and 118 depends on the size and shape of the junction box 102. This problem is indicated by the schematic X shown in the middle of FIG. 1.

Figure 2:
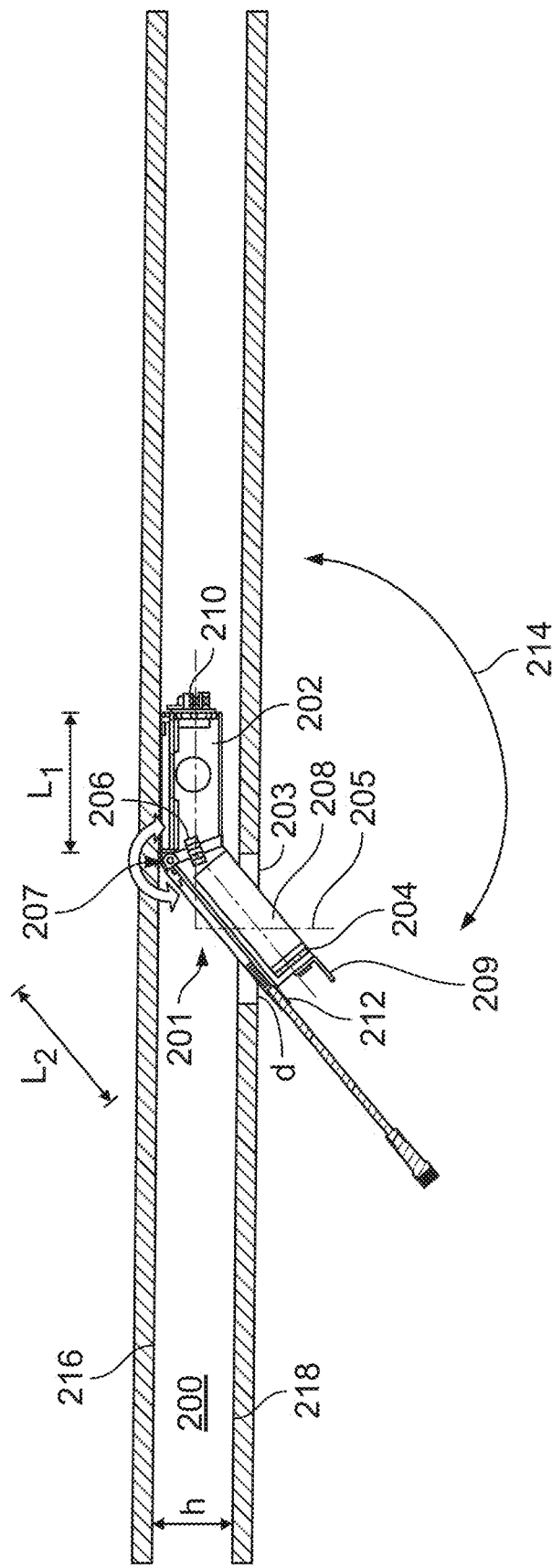
FIG. 2 shows illustrative apparatus, in partial cross section, in accordance with the principles of the invention, along with other apparatus and, in cross section, environmental structure.

FIG. 2 shows illustrative apparatus in accordance with the principles of the invention along with environmental structure. Hinged junction box 201 according to the current disclosure is shown. Hinged junction box 201 may be hinged about a pivot point 207. Electrical wires (not shown) or other connections associated with hinged junction box 201 may be coupled, at first end 202, to a strain release clamp 210. This coupling may be implemented at a knock-out (see FIG. 4, cable collar 411) in junction box 201. In certain embodiments, power line(s) and, possibly, communication lines, may enter through a knock-out in junction box 201, coupled to electrical connections within junction box 201, and then exit through a second knock-out in junction box 201.

Such wires may enter first end 202. Such wires may include power wires. Such wires may support transmission of power line control ("PLC") signals or other suitable wires. It should be noted that, in some embodiments, PLC signals may be superimposed on a 110/220 VAC power line.

The wires may be connected in first end 202 to leads from LED lighting module circuitry 208. Thereafter, the leads may pass through conduit 206 into second end 204.

Second end 204 may house LED lighting module circuitry 208. Output leads may exit LED lighting module circuitry 208, and be coupled to load power cable end 212, at the distal portion of second end 204. Cable 212 may be flexible. Circuitry included in second end 204 may include voltage converters, dimming circuitry, powerline module (high frequency), or other suitable circuitry.

"Elbow-shaped" path 205 is shown in FIG. 2. Illustrative features of hinged junction box 201 are evident from FIG. 2. Specifically, FIG. 2 shows hinged junction box 201, in an articulated configuration, passing through elbow-shaped path 205 and into fixture aperture 203. Fixture aperture 203 may have any suitable aperture, for example any diameter in the range of 2"-10", or, for example, 3¾". Fixture aperture 203 may have a diameter that is larger or smaller than 3¾".

The length of the first end 202 of junction box 201 is shown as L1, and the length of the second end 204 of junction box 201 is shown at L2. A central longitudinal axis of each of ends 202 and 204 is also shown. The central longitudinal axis of each of ends 202 and 204 are shown intersecting at conduit 206.

L1 and L2 may have any suitable length. It should be noted that an exemplary length of L1 is about 90 millimeters ("mm") while an exemplary length of L2 is about 101.5 mm. While the length of L2 may be fixed at not less than about 90 mm at least because of the size of the LED circuitry located therein, the length of L1 can be smaller or larger than the exemplary length of 90 mm. For example, L1 can be any suitable number between 50 mm and 140 mm. The variability of L1 may be limited by the context of the electrical requirements of a junction box.

It should be noted that an exemplary angle 214 represents an angle between either first and second ends 202 and 204 or between a longitudinal axis of first end 202 and a longitudinal axis of second end 204. Other angles are possible and contemplated herein.

It should be noted that, in some embodiments, the focus of the angles contemplates a pivot between the two component ends of junction box 201. Also contemplated herein is the possibility of disposition of the pivot at a location other than the center-point of the hinged junction box 201. Instead, first end 202 of hinged junction box 201 could be longer or shorter than second end 204. Height h 200 of plenum space indicates the height between top ceiling structure 216 and bottom ceiling structure 218. Screw-down tab 209 for affixing junction box 201 is also shown in FIG. 2. Height h may be any suitable height. It should be noted that a height h may be 2", 2¹⁄₁₆", 3", 4" or any suitable height between 2"-6" or more than 6". Height h typically depends on the construction of the ceiling of the building in which junction box 201 is being installed. It should be noted that height h may accommodate the vertical depth of an exemplary light fixture (such as 2") plus the depth of the heads of nuts (such as ¹⁄₁₆") protruding from the back of the light fixture.

Figure 3:
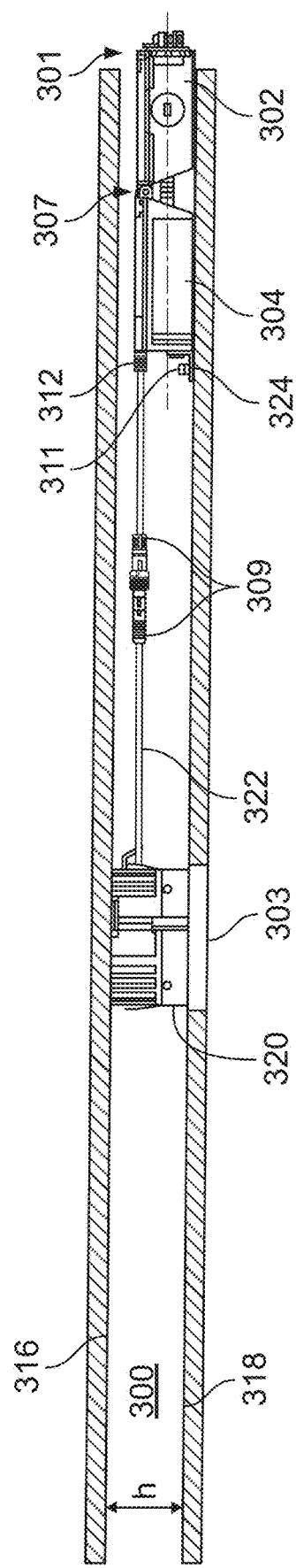
FIG. 3 shows illustrative apparatus in accordance with the principles of the invention along with other apparatus and, in cross section, environmental structure.

FIG. 3 shows illustrative apparatus in accordance with the principles of the invention along with environmental structure.

Height h of the plenum space 200 is indicated. Plenum space 200 is bound on the top by ceiling structure 216 and at the bottom by second ceiling structure 218.

A hinged junction box 301 is shown. Hinged junction box 301 may include a first end 302, and second end 304, a pivot 307, and may support, engage, or accommodate passage of load power cable end 312, which may be in electrical communication with connector 309. Load power cable end 312 and connector 309 may connect fixture 320 to junction box 301.

Screw-down tab 324 for affixing junction box 30, via screw 311, is also shown in FIG. 3. Fixture aperture 303 is shown, as well. Fixture 320 is fixedly positioned with its light projecting apparatus oriented towards, and through, fixture aperture 303.

Figure 4:
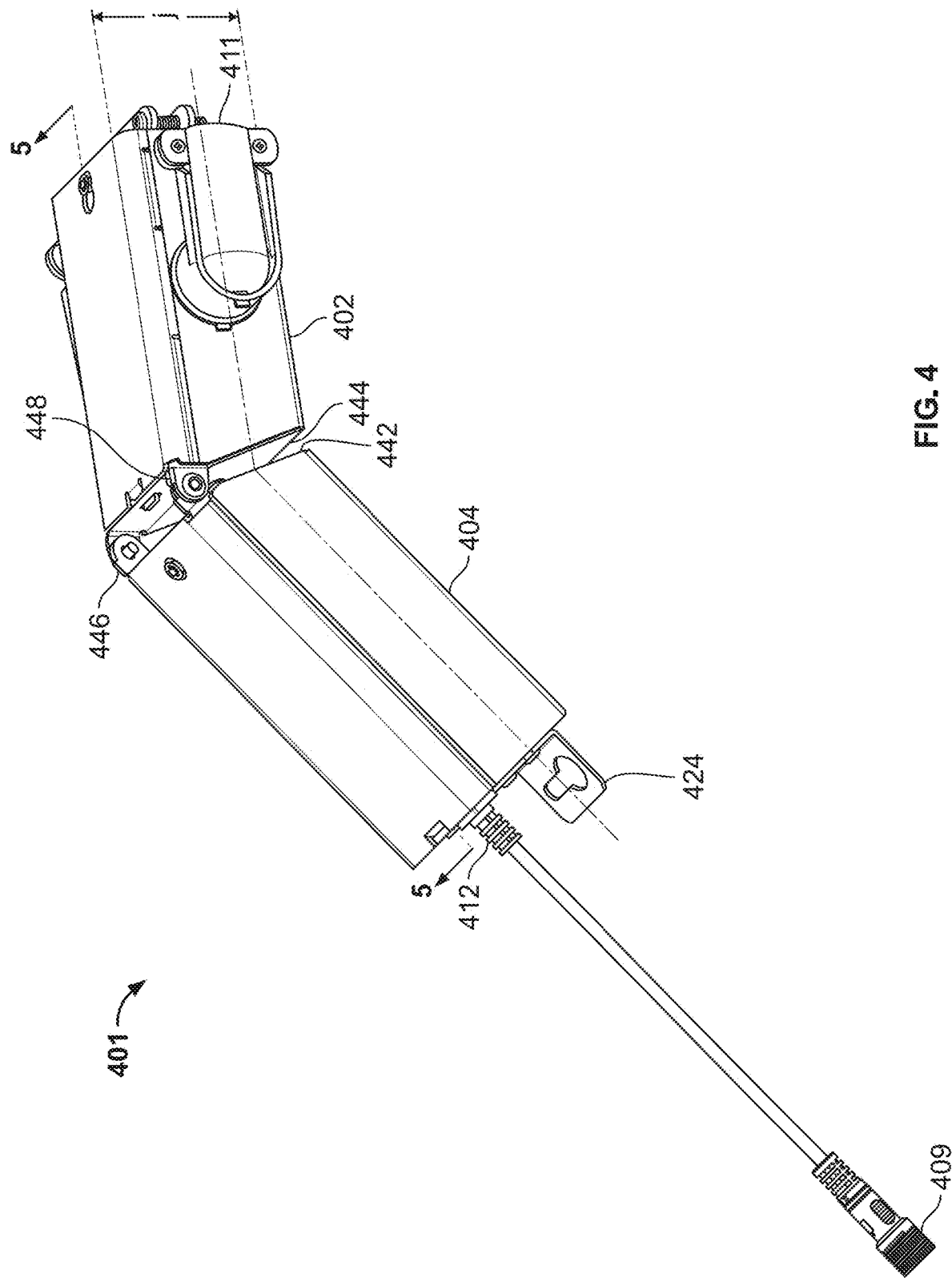
FIG. 4 shows illustrative apparatus in accordance with the principles of the invention along with other apparatus.

FIG. 4 shows illustrative apparatus in accordance with the principles of the invention along with other apparatus and environmental structure.

FIG. 4 shows a hinged junction box 401. Hinged junction box is shown in an articulated configuration. Hinged junction box 401 may include a first end 402 and second end 404.

Hinged junction box 401 may include a cable collar 411 at a knock-out in the side of first end 402. Such a cable collar 411 may provide an entry point for power wires and/or control to enter into first end 402. At 409, FIG. 4 shows a connector 409 for connecting load power cable end 412 to an LED light source in an installed fixture (not shown in FIG. 4). Screw-down tab 424 for affixing junction box 401 is also shown in FIG. 4.

FIG. 4 also shows a plurality of detents 442, 444, 446, 448. Detents 442 and 444 may act as a pair to stop first end 402 and second end 404 from pivoting beyond a desired angle. As such detents 442 and 444 may preclude first end 402 and second end 404 from pivoting relative to one another past a certain predetermined angle.

Each of detents 446 and 448 may act as a pivot point. In the exemplary embodiments shown in FIG. 4, detents 446 and 448 may prevent the two ends of hinged junction box 401 from extending past 180 degrees. Other detents for suitable angle-limiting mechanisms are possible and within the scope of the current disclosure.

Figure 5:
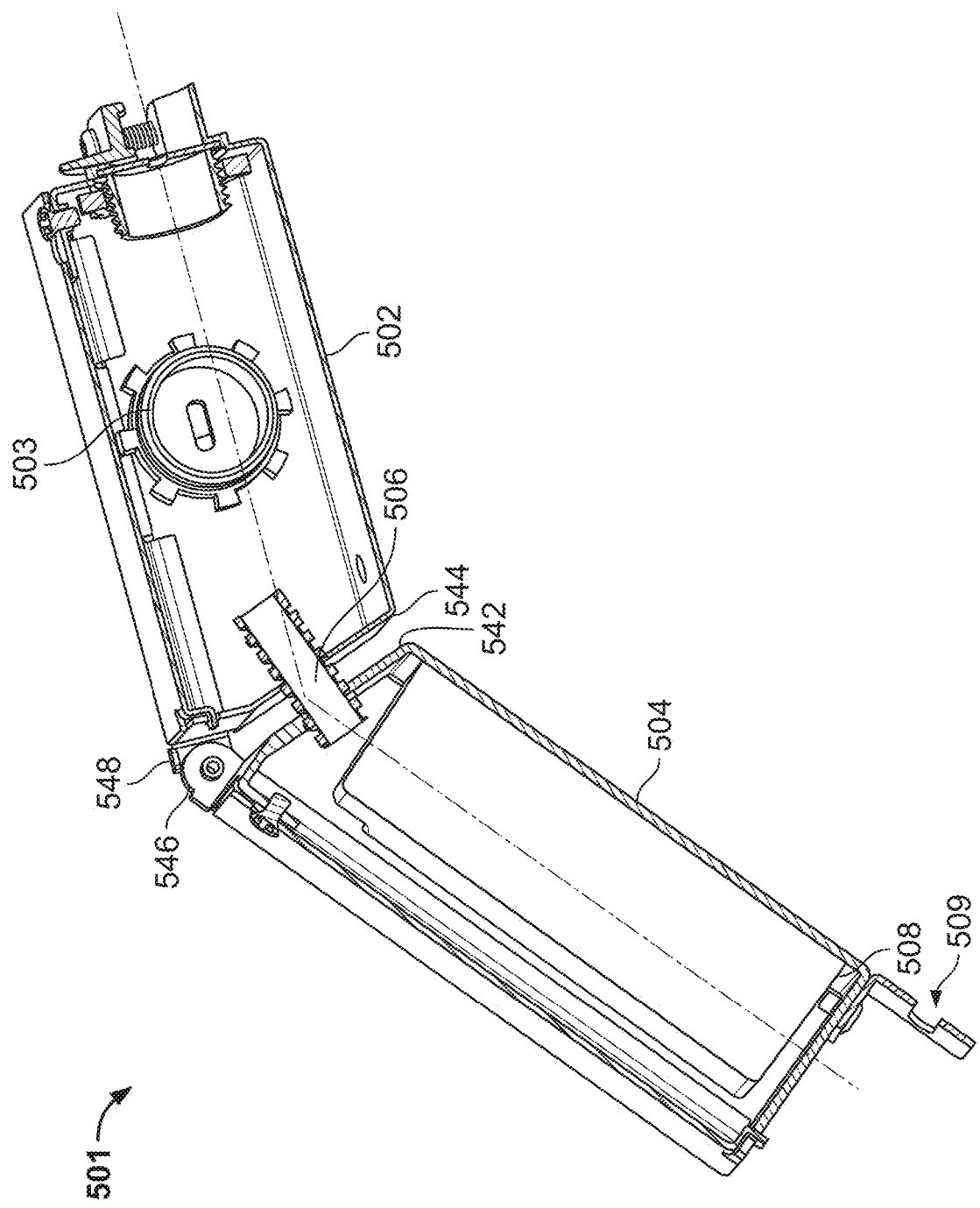
FIG. 5 shows illustrative apparatus in accordance with the principles of the invention, in partial cross section, taken along view lines 5-5 (shown in FIG. 4), along with other apparatus in partial cross section.

FIG. 5 shows a sectional view of an illustrative apparatus in accordance with the principles of the invention.

Wires (not shown), including power lines, PLC, and/or other suitable types of electronic communications such as dimming signals, may be fed into first end 502 via orifice 503. Thereafter, the wires may be fed through conduit 506 to provide electrical power, PLC, and/or other suitable types of electronic communications to LED light source circuitry 508 (which may or may not be enclosed in a housing inside junction box 501) in second end 504.

Pairs of detents are shown at 542, 544 and 546, 548. Detent pairs 542, 544 and 546, 548 may set lower bounds and upper bounds for the articulation level of an angle formed by first end 502 with respect to second end 504. At 509, the screw-down tab is shown. Screw-down tab 509 is one embodiment of a structure that enables hinged junction box 501 to be mounted to a ceiling structure. Such mounting may be implemented by sliding screw-down tab 509 onto and over a screw or other suitable structure and down through the narrower part of a slot on the sliding screw-down tab 509. Such a screw-down tab 510 fastener, or other structure, could be attached after positioning, or otherwise deploying, junction box 510.

Figure 6:
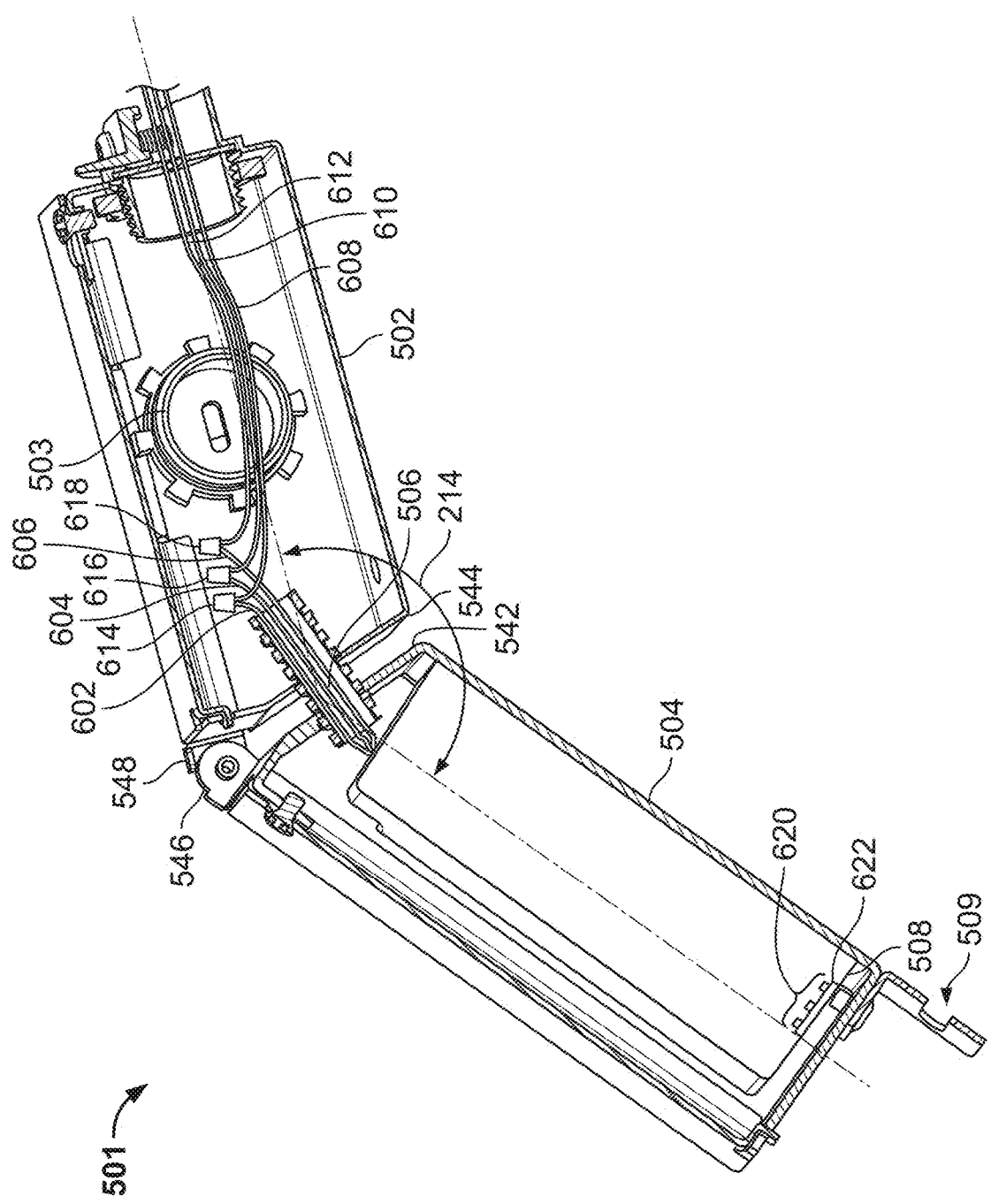
FIG. 6 shows illustrative apparatus in accordance with the principles of the invention, in partial cross section, along with other apparatus in partial cross section.

FIG. 6 shows junction box 501 with line power terminations 602, 604 and 606. Line power terminations 602, 604 and 606 may be connected to line power wires (e.g, line voltage, neutral and ground) 608, 610 and 612, respectively, via, for example, wire nuts 614, 616 and 618, respectively. Line power terminations 602, 604 and 606 may include one or more of leads, terminals, connectors, solder points or any other suitable termination.

LED light source circuitry 508 may include one or more load power terminations such as 620 that may provide power to a load such as fixture 320. Load power terminations 620 may include one or more of leads, terminals, connectors, solder points or any other suitable termination, for providing electrical continuity to wires leading to the fixture. Load power terminations 620 may be internal to the housing of LED light source circuitry 508. Load power terminations 620 may be in electrical communication with a printed circuit board such as 622, which may be fixed to the housing of LED light source circuitry 508.

Figure 7:
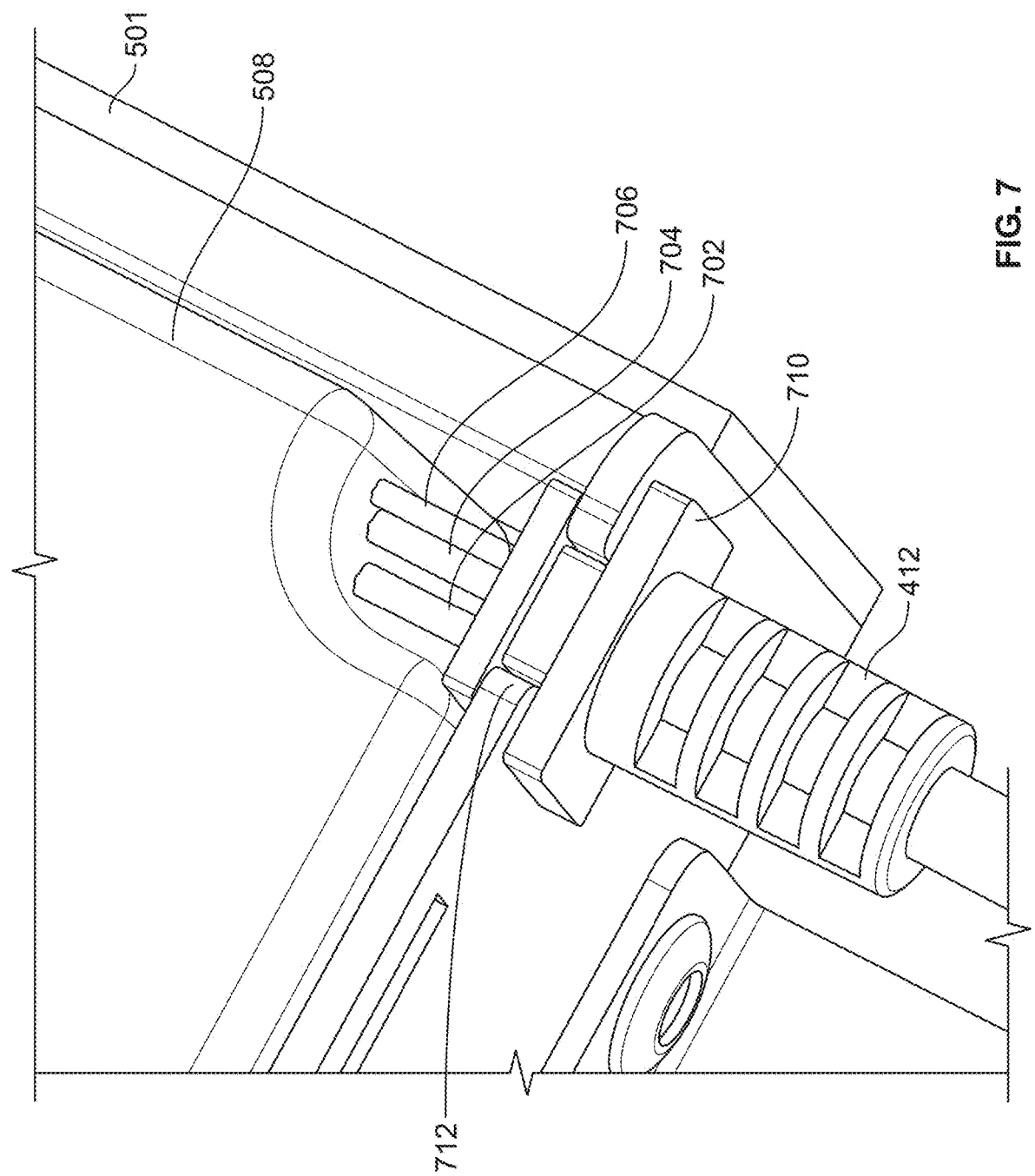
FIG. 7 shows, in partial view, illustrative apparatus in accordance with the principles of the invention, along with other apparatus in partial cross section.

FIG. 7 shows junction box 501, in part, with a top panel removed. Load wires 702, 704 and 706 may extend from load power cable end 412 into junction box 501. Load wires 702, 704 and 706 may be connected to or continuous with load power terminations 620 (shown in FIG. 6), to receive power for a load such as fixture 320. Power cable end 412 may include double-flanged fitting 710. Notch 712 in junction box 501 may receive double-flanged fitting 710. The top panel of junction box 501 may lock double-flanged fitting 710 in notch 712.

The steps of methods disclosed herein may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Thus, systems and methods for providing power to a fixture have been provided. Persons skilled in the art will appreciate that the present invention may be practiced by other than the described embodiments, which are presented for purposes of illustration rather than of limitation.

What is claimed is:

1. An apparatus for providing power to a fixture, the apparatus comprising:
  a housing comprising a junction box, the housing having:
    a first end:
      comprising a knock-out; and
      configured to house a line power termination; and
    a second end that is configured to house a load power termination;
  wherein:
    the first and second ends are:
      linked pivotably to each other; and
      configured to articulate with respect to each other and between:
        a first angle, at which the first and second ends can pass along an elbow-shaped path into a plenum space; and
        a second angle, at which the first and second ends cannot pass along the elbow-shaped path.

2. The apparatus of claim 1 wherein the first end is configured to conform to a volume-standard for housing a wire-nut power line termination.

3. The apparatus of claim 1 wherein the second end is configured to house a lighting module circuit that is configured to provide current to an LED light source.

4. The apparatus of claim 1 further comprising, when the second angle is greater than the first angle, a detent that prevents articulation of the first and second ends to a third angle that is greater than the second angle.

5. The apparatus of claim 4 further comprising, when the second angle is greater than the first angle, a detent that prevents articulation of the first and second ends to a fourth angle that is less than the first angle.

6. The apparatus of claim 1 further comprising a hinge via which the first and second ends are configured to articulate with respect to each other.

7. The apparatus of claim 6 wherein the hinge includes:
a first pivot that couples a first side of the first end to a first side of the second end; and
a second pivot:
that couples a second side of the first end to a second side of the second end; and
is aligned with the first pivot.

8. The apparatus of claim 1 wherein the first end includes an enclosure.

9. The apparatus of claim 1 wherein the second end includes an enclosure.

10. The apparatus of claim 1 further comprising a conduit; wherein:
the first end includes a first enclosure;
the second end includes a second enclosure; and,
together, the first end, the second end and the conduit define the housing.

11. The apparatus of claim 1 further comprising a conduit; wherein:
the first end includes a first enclosure;
the second end includes a second enclosure; and
the conduit defines a flexible passageway between the first enclosure and the second enclosure.

12. An apparatus for providing power to a fixture, the apparatus comprising:
a housing comprising a junction box, the housing having:
a first end comprising a knock-out and configured to house a line power termination, the first end comprising a first axis; and
a second end that is configured to house a load power termination, the second end comprising a second axis;
wherein:
the first end and the second end are linked pivotably to each other; and
the first and second axes are configured to articulate with respect to each other and between:
a first angle, at which the first and second ends can pass along an elbow-shaped path into a plenum space; and
a second angle, at which the first and second ends cannot pass along the elbow-shaped path.

13. The apparatus of claim 12 wherein the first end is configured to conform to a volume-standard for housing a wire-nut power line termination.

14. The apparatus of claim 12 wherein the second end is configured to house a lighting module circuit that is configured to provide current to an LED light source.

15. The apparatus of claim 12 further comprising, when the second angle is greater than the first angle, a detent that prevents articulation of the first and second axes to a third angle that is greater than the second angle.

16. The apparatus of claim 15 further comprising, when the second angle is greater than the first angle, a detent that prevents articulation of the first and second axes to a fourth angle that is less than the first angle.

17. The apparatus of claim 12 further comprising a hinge via which the first and second axes are configured to articulate with respect to each other.

18. The apparatus of claim 17 wherein the hinge includes:
a first pivot on a first side of the housing; and
a second pivot:
on a second side of the housing; and
aligned with the first pivot.

19. The apparatus of claim 12 wherein the first end includes an enclosure.

20. The apparatus of claim 12 wherein the second end includes an enclosure.

21. The apparatus of claim 12 further comprising a conduit;
wherein:
the first end includes a first enclosure;
the second end includes a second enclosure; and,
together, the first end, the second end and the conduit define the housing.

22. The apparatus of claim 12 further comprising a conduit;
wherein:
the first end includes a first enclosure;
the second end includes a second enclosure;
the conduit defines a flexible passageway between the first enclosure and the second enclosure; and
the first axis and the second axis run through the conduit.

23. An apparatus for providing power to a fixture, the apparatus comprising:
a housing comprising a junction box, the housing having:
a first end comprising a knock-out and configured to house a line power termination, the first end comprising a first longitudinal axis; and
a second end that is configured to house a load power termination, the second end comprising a second longitudinal axis;
wherein:
the first end and the second end are linked pivotably to each other; and
the first and second longitudinal axes are configured to articulate with respect to each other and between:
a first angle, at which the first and second ends can pass along an elbow-shaped path into a plenum space; and
a second angle, at which the first and second ends cannot pass along the elbow-shaped path.

24. The apparatus of claim 23 further comprising, when the second angle is greater than the first angle, a detent that prevents articulation of the first and second longitudinal axes to a third angle that is greater than the second angle.

25. The apparatus of claim 24 further comprising, when the second angle is greater than the first angle, a detent that prevents articulation of the first and second longitudinal axes to a fourth angle that is less than the first angle.

26. The apparatus of claim 23 further comprising a hinge via which the first and second longitudinal axes are configured to articulate with respect to each other.

27. The apparatus of claim 23 further comprising a conduit;
wherein:
the first end includes a first enclosure;
the second end includes a second enclosure;
the conduit defines a flexible passageway between the first enclosure and the second enclosure; and
the first longitudinal axis and the second longitudinal axis run through the conduit.

28. An apparatus for providing power to a fixture, the apparatus comprising:
a housing having:
a first end comprising a knock-out and configured to house a line power termination; and
a second end that is configured to house a load power termination; and
a conduit;
wherein:
the first and second ends are configured to articulate with respect to each other;
the first end includes a first enclosure;
the second end includes a second enclosure; and,
together, the first end, the second end and the conduit define the housing.

29. The apparatus of claim 28 wherein the first end is configured to conform to a volume-standard for housing a wire-nut power line termination.

30. The apparatus of claim 28 wherein the second end is configured to house a lighting module circuit that is configured to provide current to an LED light source.

31. The apparatus of claim 28 wherein:
the first end and the second end are:
linked pivotably to each other; and
configured to articulate between:
a first angle, at which the first and second ends can pass along an elbow-shaped path into a plenum space; and
a second angle, at which the first and second ends cannot pass along the elbow-shaped path.

32. The apparatus of claim 31 further comprising, when the second angle is greater than the first angle, a detent that prevents articulation of the first and second ends to a third angle that is greater than the second angle.

33. The apparatus of claim 32 further comprising, when the second angle is greater than the first angle, a detent that prevents articulation of the first and second ends to a fourth angle that is less than the first angle.

34. The apparatus of claim 28 further comprising a hinge via which the first and second ends are configured to articulate with respect to each other.

35. The apparatus of claim 34 wherein the hinge includes:
a first pivot that couples a first side of the first end to a first side of the second end; and
a second pivot:
that couples a second side of the first end to a second side of the second end; and
is aligned with the first pivot.

36. The apparatus of claim 28 wherein the conduit defines a flexible passageway between the first enclosure and the second enclosure.

37. An apparatus for providing power to a fixture, the apparatus comprising:
a housing having:
a first end comprising a knock-out and configured to house a line power termination; and
a second end that is configured to house a load power termination; and
a conduit;
wherein:
the first and second ends are configured to articulate with respect to each other;
the first end includes a first enclosure;
the second end includes a second enclosure; and
the conduit defines a flexible passageway between the first enclosure and the second enclosure.

38. The apparatus of claim 37 wherein the first end is configured to conform to a volume-standard for housing a wire-nut power line termination.

39. The apparatus of claim 37 wherein the second end is configured to house a lighting module circuit that is configured to provide current to an LED light source.

40. The apparatus of claim 37 wherein:
the first end and the second end are:
linked pivotably to each other; and
configured to articulate between:
a first angle, at which the first and second ends can pass along an elbow-shaped path into a plenum space; and
a second angle, at which the first and second ends cannot pass along the elbow-shaped path.

41. The apparatus of claim 40 further comprising, when the second angle is greater than the first angle, a detent that prevents articulation of the first and second ends to a third angle that is greater than the second angle.

42. The apparatus of claim 41 further comprising, when the second angle is greater than the first angle, a detent that prevents articulation of the first and second ends to a fourth angle that is less than the first angle.

43. The apparatus of claim 37 further comprising a hinge via which the first and second ends are configured to articulate with respect to each other.

44. The apparatus of claim 43 wherein the hinge includes:
a first pivot that couples a first side of the first end to a first side of the second end; and
a second pivot:
that couples a second side of the first end to a second side of the second end; and
is aligned with the first pivot.

45. The apparatus of claim 37 wherein the first end, the second end and the conduit define the housing.

46. An apparatus for providing power to a fixture, the apparatus comprising:
a housing having:
a first end comprising a knock-out and configured to house a line power termination, the first end comprising a first axis; and
a second end that is configured to house a load power termination, the second end comprising a second axis; and
a conduit;
wherein:
the first and second axes are configured to articulate with respect to each other;
the first end includes a first enclosure;
the second end includes a second enclosure; and,
together, the first end, the second end and the conduit define the housing.

47. The apparatus of claim 46 wherein the first end is configured to conform to a volume-standard for housing a wire-nut power line termination.

48. The apparatus of claim 46 wherein the second end is configured to house a lighting module circuit that is configured to provide current to an LED light source.

49. The apparatus of claim 46 wherein:
the first end and the second end are linked pivotably to each other; and
the first and second axes are configured to articulate between:
a first angle, at which the first and second ends can pass along an elbow-shaped path into a plenum space; and
a second angle, at which the first and second ends cannot pass along the elbow-shaped path.

50. The apparatus of claim 49 further comprising, when the second angle is greater than the first angle, a detent that prevents articulation of the first and second axes to a third angle that is greater than the second angle.

51. The apparatus of claim 50 further comprising, when the second angle is greater than the first angle, a detent that prevents articulation of the first and second axes to a fourth angle that is less than the first angle.

52. The apparatus of claim 46 further comprising a hinge via which the first and second axes are configured to articulate with respect to each other.

53. The apparatus of claim 52 wherein the hinge includes:
a first pivot on a first side of the housing; and
a second pivot:
on a second side of the housing; and
aligned with the first pivot.

54. The apparatus of claim 46 wherein:
the conduit defines a flexible passageway between the first enclosure and the second enclosure; and
the first axis and the second axis run through the conduit.

55. An apparatus for providing power to a fixture, the apparatus comprising:
a housing having:
a first end comprising a knock-out and configured to house a line power termination, the first end comprising a first axis; and
a second end that is configured to house a load power termination, the second end comprising a second axis; and
a conduit;
wherein:
the first and second axes are configured to articulate with respect to each other;
the first end includes a first enclosure;
the second end includes a second enclosure;
the conduit defines a flexible passageway between the first enclosure and the second enclosure; and
the first axis and the second axis run through the conduit.

56. The apparatus of claim 55 wherein the first end is configured to conform to a volume-standard for housing a wire-nut power line termination.

57. The apparatus of claim 55 wherein the second end is configured to house a lighting module circuit that is configured to provide current to an LED light source.

58. The apparatus of claim 55 wherein:
the first end and the second end are linked pivotably to each other; and
the first and second axes are configured to articulate between:
a first angle, at which the first and second ends can pass along an elbow-shaped path into a plenum space; and
a second angle, at which the first and second ends cannot pass along the elbow-shaped path.

59. The apparatus of claim 58 further comprising, when the second angle is greater than the first angle, a detent that prevents articulation of the first and second axes to a third angle that is greater than the second angle.

60. The apparatus of claim 59 further comprising, when the second angle is greater than the first angle, a detent that prevents articulation of the first and second axes to a fourth angle that is less than the first angle.

61. The apparatus of claim 55 further comprising a hinge via which the first and second axes are configured to articulate with respect to each other.

62. The apparatus of claim 61 wherein the hinge includes:
a first pivot on a first side of the housing; and
a second pivot:
on a second side of the housing; and
aligned with the first pivot.

63. The apparatus of claim 55 further wherein the first end, the second end and the conduit define the housing.

64. An apparatus for providing power to a fixture, the apparatus comprising:
a housing having:
a first end comprising a knock-out and configured to house a line power termination, the first end comprising a first longitudinal axis; and
a second end that is configured to house a load power termination, the second end comprising a second longitudinal axis; and
a conduit;
wherein:
the first and second longitudinal axes are configured to articulate with respect to each other;
the first end includes a first enclosure;
the second end includes a second enclosure;
the conduit defines a flexible passageway between the first enclosure and the second enclosure; and
the first longitudinal axis and the second longitudinal axis run through the conduit.

65. The apparatus of claim 64 wherein:
the first end and the second end are linked pivotably to each other; and
the first and second longitudinal axes are configured to articulate between:
a first angle, at which the first and second ends can pass along an elbow-shaped path into a plenum space; and
a second angle, at which the first and second ends cannot pass along the elbow-shaped path.

66. The apparatus of claim 65 further comprising, when the second angle is greater than the first angle, a detent that prevents articulation of the first and second longitudinal axes to a third angle that is greater than the second angle.

67. The apparatus of claim 66 further comprising, when the second angle is greater than the first angle, a detent that prevents articulation of the first and second longitudinal axes to a fourth angle that is less than the first angle.

68. The apparatus of claim 64 further comprising a hinge via which the first and second longitudinal axes are configured to articulate with respect to each other.

* * * * *